Figure 1:
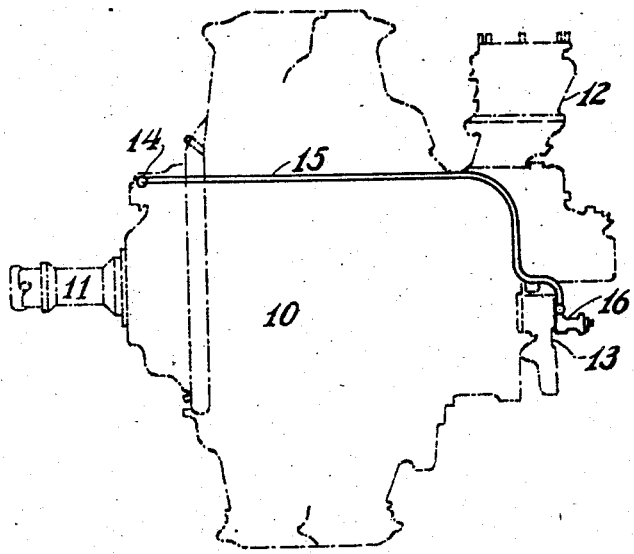

Oct. 13, 1942.  W. G. OVENS  2,298,646

LUBRICATION SYSTEM

Filed Oct. 8, 1940

WILLIAM G. OVENS
INVENTOR

BY
ATTORNEY

Patented Oct. 13, 1942

2,298,646

UNITED STATES PATENT OFFICE 2,298,646

LUBRICATION SYSTEM

William G. Ovens, Midland Park, N. J., assignor to Wright Aeronautical Corporation, a corporation of New York Application October 8, 1940, Serial No. 360,229

4 Claims. (Cl. 184—6)

This invention relates to pressure lubricating systems, particularly for internal combustion engines.

In the conventional internal combustion engine lubricating system, particularly when applied to aircraft, a pressure pump is secured to and is driven by the engine, this pump picking up oil from a reservoir and transmitting it through various conduits within the engine to the parts to be lubricated. Surplus oil delivered by the pump is returned to a sump and thence by means of the scavenging oil pump to the oil reservoir. In order to limit the pressure and amount of oil fed to the various parts, a pressure relief valve is normally disposed close to the pump and serves to by-pass some of the oil delivered by the pump back to the reservoir or to the pump intake, whereby the maximum oil pressure at the pump delivery will be held substantially constant. Since the flow of oil through the various bearings within the engine is fairly high, it will be appreciated that the most remote point at which oil is delivered by the pump may be subject to a pressure substantially less than that existing at the pump delivery to the end that the lubricant supply at such remote point may be inadequate. Furthermore, it is desirable to dispose the pressure relief valve close to the pump, rather than at the extreme end of the system, so that the bleed of oil through the valve may be conducted directly to the pump intake rather than passing through the whole scavenging system of the engine as would be necessary if the relief valve were disposed at the end of the system.

It is an object of this invention to provide a pressure control system in a force feed lubricating system by which determinate pressure may be maintained at that end of the system most remote from the pump while disposing the relief valve itself close to the pump.

It is a further object of the invention to provide a remote control bypass valve for pressure fluid, the remote control being afforded by a control pressure from a point in the system remote from the bypass valve and pump.

A further object of the invention is to provide a pressure relief valve on an engine lubricating pump whose action will be controlled by lubricant pressure from a remote point in the system.

Figure 2:
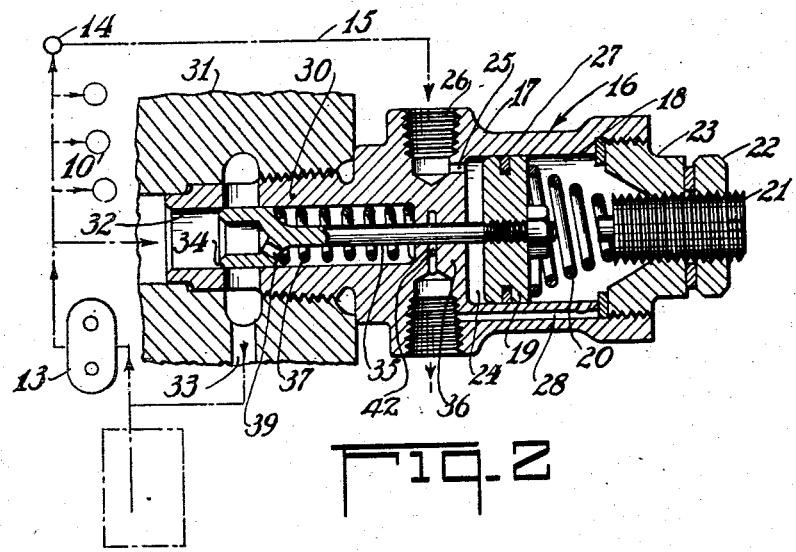

Further objects of the invention will be appreciated in reading the detailed description below in connection with the drawing, in which:

Fig. 1 is a diagrammatic side elevation of an aircraft engine showing the disposition of the valve of the invention with respect thereto; and Fig. 2 is a longitudinal section through the control valve of the invention, the connections thereof with respect to other engine components being indicated diagrammatically.

Referring briefly to Fig. 1, 10 indicates a radial cylinder aircraft engine having a power shaft 11, a carburetor 12, and a pressure oil pump 13, the latter serving, by means well known in the art, to lubricate the interior of the engine through suitable conduits and passages. The closed pressure system from the pump 13 extends close to the front of the engine and point 14 represents an extreme point to which pressure lubricant is carried. It is desired that a specific lubricant pressure be available at the point 14 a non-inventive solution to attain this end comprising the disposition at that point of a loaded pressure relief valve. However, if such a valve were used, the flow therefrom would necessarily have to pass through the entire scavenging system of the engine. I propose to lead a conduit 15 from the point 14 to a pressure control valve unit 16 mounted upon the pressure pump 13. Fig. 2 shows the control valve unit 16 in detail.

The unit comprises a housing 17 having formed at its right end a cylinder 18 within which a piston 19 is slidable, the latter being loaded by means of a spring 20 whose initial compression is adjusted by a screw 21 locked by a nut 22 upon a cylinder cover 23 screwed into the housing 17. The inner end of the cylinder defines with the piston 19 a space 24 which connects, througn a drilling 25 and a receptacle 26, with the conduit 15. Thus, oil pressure transmitted through the conduit 15 will tend to move the piston 19 to the right against the spring 20. The piston is provided with a sealing ring 27 engaging the cylinder bore but any leakage of oil past the piston will be returned to the oil reservoir or to the oil sump through a drilling 28. The left end of the unit 16 comprises a plug 30 screwed into the oil pump body 31 and includes an axial drilling 32 open to oil pump pressure and a radial drilling 33 open to the intake side of the oil pump. A plunger valve 34 is movable in the drilling 32 to cover and uncover the drilling 33, said plunger having a stem 35 passing through a central wall of the valve body to be secured to the piston 19. The head of the plunger 34 is backed up by an auxiliary spring 37 which acts to augment the effect of the spring 20. Furthermore, the head of the plunger 34 is provided with a drilling 39 to permit oil pump pressure to exist in the blind cavity behind the plunger head so that the plunger head is substantially balanced. The housing includes a vent 42 between the space 24 and the inner end of the drilling 32 to prevent fluid pressure transmission therebetween, the vent leading to the sump along with bleed from the drilling 28.

The operation of the system is as follows: Pump pressure is imposed on the plunger 34 but will have no effect thereon directly since the plunger is balanced. Pressure oil travels through the engine, lubricating the components thereof, indicated at 10' in Fig. 2, until it reaches the end of the system at 14 and whereat the pressure will be substantially diminished due to the bleed of oil within the engine. This diminished pressure is imposed on the piston 19 through the conduit 15 and if insufficient to compress the springs 20 and 37, there will be no by-passing of oil from the drilling 32 to the drilling 33 and consequently, the pressure in the system will build up. As soon as the pressure at the point 14 builds up to a degree sufficient to move the piston 19 against its springs 20 and 37, the bypass plunger 34 will open to bleed oil from the pump outlet, maintaining a pressure thereat at a value somewhat higher than the pressure at the point 14, as determined by the pressure drop from the pump outlet to the point 14.

In addition to the objects and advantages of the invention already set forth, the following may be noted: Only the amount of oil needed to lubricate engine parts flows into the engine, the surplus being by-passed directly from the pump delivery to the pump intake. This allows of the use of small oil conduits within the engine without suffering a large pressure drop in the system. If the oil relief valve were at the point 14, all of the pumped oil would have to flow through the system, requiring large oil conduits.

Only the amount of oil needed to lubricate engine parts is thrown into the engine sump, simplifying both the scavenging and oil cooling problem. Obviously, a small amount of hot oil may be cooled more effectively, and in a smaller cooler, than a large amount of less hot oil as would have to be cooled if the relief valve were remote from the oil pump.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine pressure lubrication system comprising an oil pump connected at its delivery side to a succession of engine components, a balanced bypass valve close to the pump delivery, and means responsive to excess oil pressure at or beyond said components to open said bypass valve.

2. An oil pressure control valve for an engine lubricating system including a pressure pump and a sump, comprising a housing secured to the engine having passages connected one with the pump delivery and one with the sump, a balanced valve, unaffected by pump pressure, openable to bypass pump oil to the sump, said housing having a cylinder separated from said passages, a piston slidable in the cylinder and directly connected to said balanced valve, spring means acting on the piston urging said valve to a closing position, and a conduit for pressure oil entering said cylinder and connecting to the lubricating system at a point remote from said pump.

3. In an engine pressure lubrication system comprising an oil pump connected at its delivery side to engine components, a balanced bypass valve close to the pump delivery, a piston motor drivably connected with the valve, means to direct oil from a point in the lubrication system remote from the pump to said motor, and means to conduct oil leaking from said valve and from said motor to the engine casing.

4. In a mechanism, a pressure fluid system comprising a fluid pump connected at its delivery side to mechanism components, low pressure fluid containing means connected to the pump intake, a balanced bypass valve near the pump delivery openable to allow fluid flow from the pump delivery to said fluid containing means, a fluid motor drivably connected to said valve, and means to direct fluid to said motor from a point in the fluid system remote from said pump.

WILLIAM G. OVENS.